Feb. 9, 1943.　　　　M. MAUL　　　　2,310,856
NUMERAL TYPE FACE
Filed Feb. 4, 1939　　　　5 Sheets—Sheet 1

INVENTOR
Michael Maul
BY
ATTORNEYS

Feb. 9, 1943.                M. MAUL                 2,310,856
                          NUMERAL TYPE FACE
                   Filed Feb. 4, 1939        5 Sheets-Sheet 2

INVENTOR
Michael Maul
BY
ATTORNEYS

Feb. 9, 1943.   M. MAUL   2,310,856
NUMERAL TYPE FACE
Filed Feb. 4, 1939   5 Sheets-Sheet 3

1 2 3 4 5 6 7 8 9 0

INVENTOR
Michael Maul
BY
W. M. Wilson
ATTORNEYS

Fig. 5
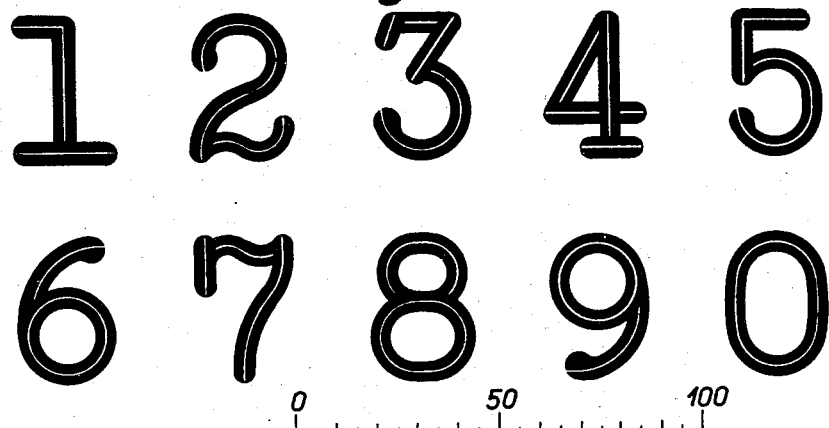
Fig. 5a
Fig. 6
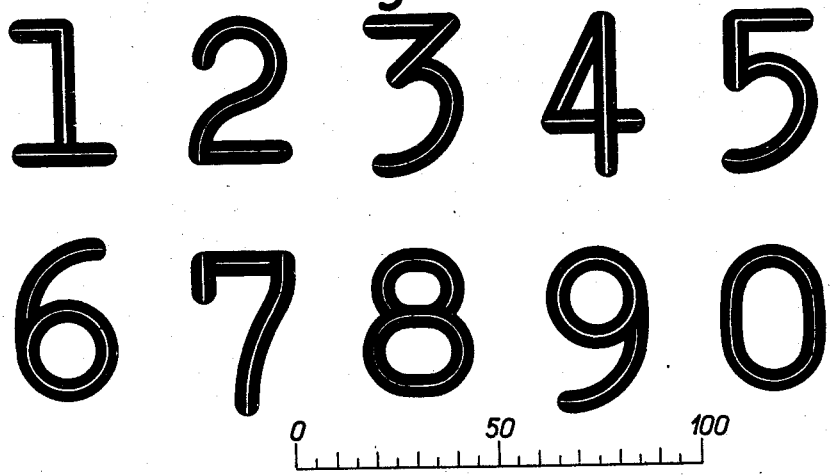
Fig. 6a

Feb. 9, 1943. M. MAUL 2,310,856
NUMERAL TYPE FACE
Filed Feb. 4, 1939     5 Sheets-Sheet 5

1 2 3 4 5
6 7 8 9 0

| 43 | 61,5 | 71,5 | 75 | 78 | 80 | 87 | 87 | 90 | 100 |
|----|------|------|----|----|----|----|----|----|-----|
| 1  | 7    | 4    | 2  | 3  | 0  | 6  | 9  | 5  | 8   |

INVENTOR
Michael Maul
BY
ATTORNEYS

Patented Feb. 9, 1943

2,310,856

UNITED STATES PATENT OFFICE 2,310,856

NUMERAL TYPE FACE

Michael Maul, Berlin-Johannisthal, Germany; vested in the Alien Property Custodian Application February 4, 1939, Serial No. 254,524
In Germany February 7, 1938

2 Claims. (Cl. 101—399)

The present invention relates to a printing device for data carriers adapted to control machinery, as disclosed and claimed in my divisional application Serial No. 285,732, filed July 21, 1939, entitled "Control element for statistical machines," and more particularly to such a device having type for forming characters differing in a manner perceivable by machinery.

In accounting in the most general sense, i. e. in bookkeeping and statistical work, one is concerned chiefly with the compilation of the data of data carriers. Compilation may be effected in several different ways such as by assorting according to certain characters and/or numbers, or by accumulation of the numbers, or by assorting and accumulation, or by subtraction or multiplication. The data carriers may assume the form of tickets, cards, or strips and the data contained thereon can be provided in such manner that control of accounting machinery is accomplished by virtue of the physical characteristics of the data.

At present the best known and most widely used mechanical compilation of data takes place in the perforated record card system in which the data is represented by selectively positioned perforations in cards. The perforated cards are analyzed by brushes which make electrical contact through the perforations to effect control of machinery, such as assorting and tubulating machines, in accordance with the meaning of the data.

Now it has already been suggested to depart from the perforated card system for the representation of data for the control of machinery by representing the data by graphical characters printed on cards and to use said graphical characters for the direct control of machinery. The use of graphical characters greatly facilitates reading of the data which is to be used for mechanical control. Since the graphical characters must cause a differential control depending upon their meaning, they must also differ in a certain manner perceivable by machinery and the type of a printing device for such graphical characters must be provided accordingly. Among the known suggestions is one in which the area of the numerical characters increases with the different numbers in such manner that the numeral 0 has the smallest and the numeral 9 the largest area, and the areas of all numerals increase in equal steps in the sequence of the order of the numerals (see U. S. Patent No. 1,853,443). Because of these differences the control of machinery can be accomplished in accordance with the meaning of the characters by light analysis thereof using a photo-electric cell. However, with the characters formed according to this known suggestion with some very thick numbers and the graduation of the areas in the sequence of the values of the numerals, a rather unpleasant picture is obtained which may also be inconvenient in practical use.

The present invention provides a novel printing device the type of which are so shaped that the type, while constantly maintaining one dimension, vary, by a systematic amount, one other dimension, only, so that the characters printed by them, differ from each other by gradually increasing areas. Moreover, in the present invention the graduation is not provided in the particular sequence of the values of the numerals, i. e. does not increase, for example proportionally with the sequence of the numerals 0–9, but independently of the particular value of the numerals but still with a graduation permitting sharp differentiation. In such small characters as in the usually applied type, it is very desirable for the purpose of the mechanical compilation that the width of the type portions forming the character lines be constant. In consideration of this circumstance, the type in the printing device according to the present invention maintain an equal width of line thereby constantly maintaining one dimension but are so shaped that they differ from each other independently of their meaning or value by different and about equally spaced lengths of their middle-line thereby varying, by a systematic amount, one dimension only. By middle-line is meant an imaginary line passing through the middle of all the lines making up the character, as will be further explained in connection with the drawings. If only numeral type are used, the shape of the type is such that they have equally graduated middle-line lengths running from the shortest middle-line numeral type (for instance "1") to the longest middle-line numeral type (for instance "8") but not sequentially increasing with the sequence of numerals 1 to 8. Of course, the provision of type according to the invention may also be applied to characters of any meaning and/or form, being restricted neither to the Arabic numeral type illustrated, nor to numeral type itself.

It is therefore an object of the present invention to provide a printing device for a data carrier adapted for the control of machinery in which type for printing a series of characters is provided with the portion of the type forming the character lines being of constant width but with different characters having different middle-line lengths whereby the characters differ from each other in their areas.

Another object is to provide a device as described in which the middle-line lengths differ from the shortest to the longest in substantially equally graduated steps independently of the meaning of the characters.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Figs. 5, 6 and 7 are prints of known shape of type in a very enlarged scale.

Figs. 5a, 6a and 7a show the scale for the middle-line lengths of the characters of Figs. 5, 6 and 7 respectively, and a table giving the lengths of the middle-lines for the various numerals.

Figure 1:
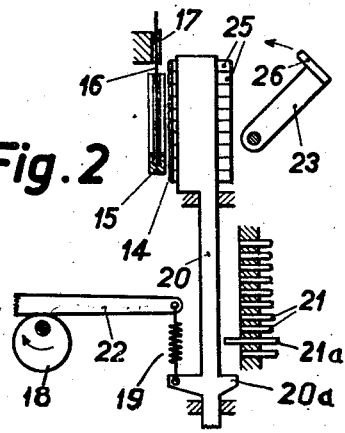
Fig. 1 shows diagrammatically a section of a typewriter-like printing mechanism.
Figure 1A:
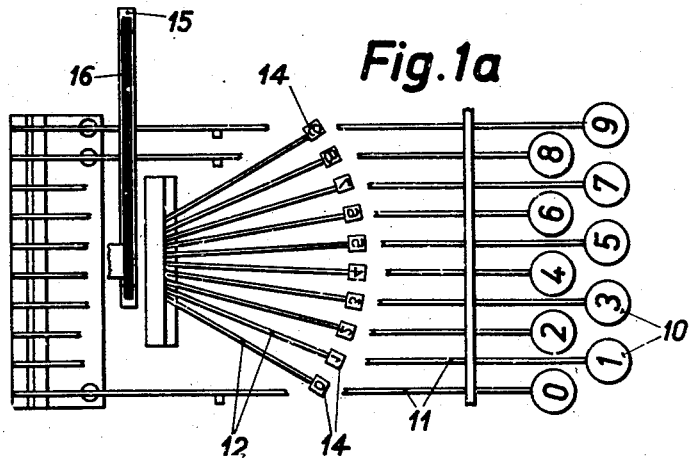
Fig. 1a is a top view of the device shown in Fig. 1.

The type according to the invention may, of course, be used in printing devices of any kind. Therefore, in Figs. 1, 1a and 2 some possible embodiments are only shown diagrammatically. In Figs. 1 and 1a a typewriter-like device has been illustrated which is adapted to print numerals only. Accordingly, this device shows a set of numeral keys 10 adapted to actuate the rock levers 12 through key levers 11 and intermediate levers 11a. On the rock levers 12 are arranged the type bodies 14 shown in a greatly enlarged scale in Fig. 3. Upon actuation of a key, the corresponding type of the type body 14 will be moved, together with the ribbon 17, against the data carrier provided in this instance as card 16, and the corresponding numeral will be printed thereupon. The carriage 15 carrying the card 16 is shifted step by step in the manner well known in the typewriter art.

Figure 2:
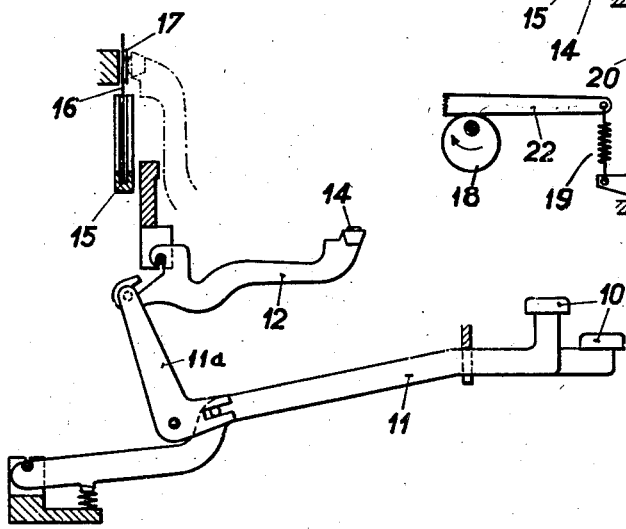
Fig. 2 shows diagrammatically in partial section an alternate printing device with type bars.

In Fig. 2, a printing device with type bars as often used in adding machines has been illustrated. A series of stops 21 is provided with each stop being movable to the position of 21a by operation of a corresponding key (not shown). A lever 22 engages cam 18 to be raised thereby and acts through spring 19 to raise type bar 20. Mounted on the upper end of type bar 20 is a series of elements 25 carrying type 14 on their ends for cooperation with a ribbon 17 to print upon card 16 in carriage 15. Type bar 20 will be raised until portion 20a engages stop 21a to position the desired element 25 for printing by the type carried thereby. Hammer 26, carried on pivoted lever 23, will then be moved to strike the selected element 25 to effect printing of the desired character. Only one type bar may be provided and the carriage 15 in Fig. 2 may be shifted step by step. However, it is also quite possible, as is also known in adding machines, to provide a plurality of rows of keys and a plurality of type bars which are simultaneously adjusted to effect printing of several characters.

Figure 3:
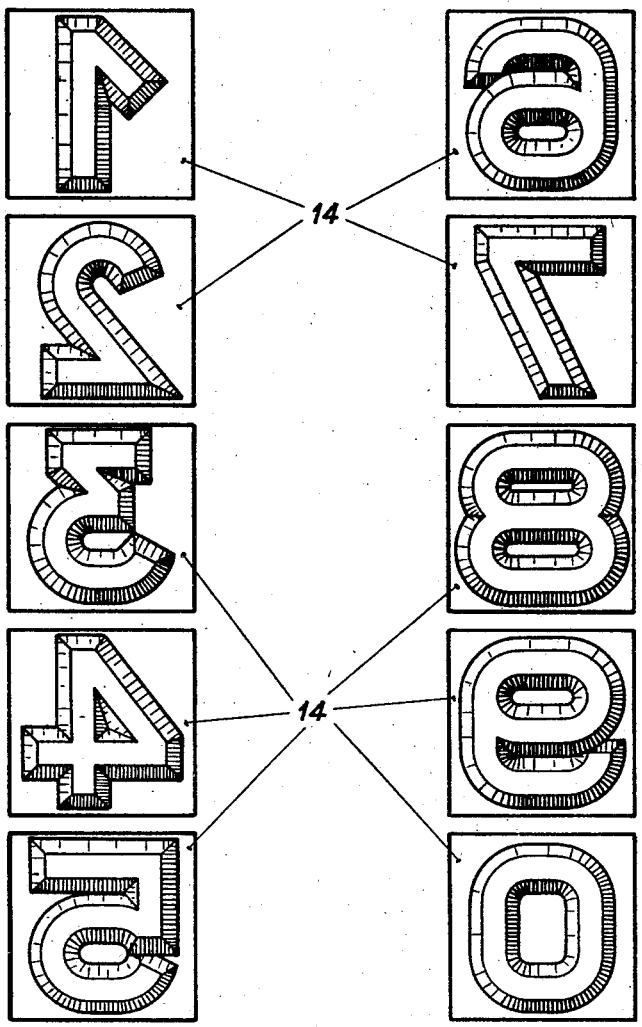
Fig. 3 shows in a very enlarged scale the set of numeral type as they are used in the devices shown in Figs. 1, 1a and 2.
Figures 4, 4A:
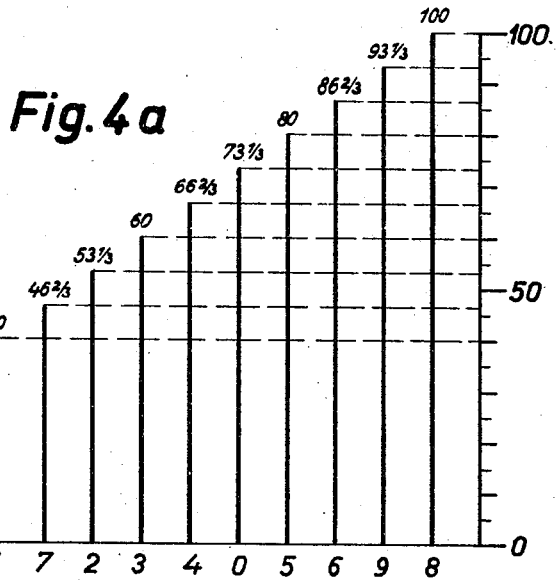
Fig. 4 shows a print of the numeral type in Fig. 3 in the same scale as Fig. 3.
Fig. 4a shows diagrammatically the lengths of the middle-lines co-ordinated to the different numeral type.

In Fig. 3, the type bodies are shown in front view in a greatly enlarged scale and Fig. 4 shows a print of the type of Fig. 3. In the numeral characters of Fig. 4, the middle-lines are indicated by thin white lines. These white lines are so inscribed as to make it obvious that since the widths of the character lines are constant and equal, the total length of the white lines of each character is an exact measure for the area of the character.

In the diagram in Fig. 4a the rectified middle-line lengths of the different numerals are shown. In the lower part of the diagram the various numerals are indicated and above each numeral a black line indicates the length of the rectified middle-line developed from Fig. 4. The arrangement is such that the longest middle-line, in the present instance the middle-line of the numeral 8, is designated as hundred units; the middle-line of the numeral 1 results then in 40 units and between these limits the middle-line lengths of the other numerals are correspondingly equally graduated. On the upper end of each middle-line length, Fig. 4a is shown the respective measure number for the middle-line length. It may be easily seen therefrom that the lengths are equally graduated.

Generally, it is not necessary to show known arrangements also in the drawings to compare them with the invention. However, in the present instance, a comparison of known printing type with the invention is difficult and inconvenient because only in an enlarged scale of the type and characters is a comparison and a proper judgment possible. Therefore, in the present instance the characters which are obtained with some known forms of type are shown in an enlarged scale and the relations with regard to their middle-lines are set down in tables. The numerals printed by a Remington portable typewriter are shown as enlarged in Fig. 5. Fig. 6 shows, also in a greatly enlarged scale, the numerals printed by a standard "Continental typewriter, and Fig. 7 shows in an enlarged scale a German standardized type (DIN 1451, medium print).

Figures 7, 7A:
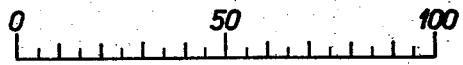

In Figs. 5, 6 and 7 the middle-line is indicated as a thin white line and the inscriptions have been made in such manner that in view of the constant width of the lines of each type, the length of the middle-line is a measure of the area of the character. It is to be noted that due to the rounded end portions in Figs. 5 and 6 the middle-lines have not been drawn entirely to the ends of the characters in order to obtain a correction for the loss of area in the before mentioned rounded end portions.

Now if the length of the longest middle-line, that of numeral 8, is set at 100 and the lengths of the middle-line of the remaining numerals are measured in that scale, the characters of Figures 5, 6 and 7 will have the middle-line lengths shown in the corresponding tables (Figs. 5a, 6a and 7a). Examination of these tables will disclose that in each set of numerals there are at least two characters having the same middle-line lengths and that the difference between the lengths of some of the others is quite insignificant. It is also obvious that the difference in lengths is very irregular.

In contrast, it will be recalled that the characters of Fig. 4 have middle-line lengths increasing in equal steps from the shortest to the longest without regard for the value of the characters.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. Type elements adapted for use with type carriers of a printing device comprising a set of type adapted upon operation of the device to print characters of the numeral series 0 through 9, the portion of the type forming the character lines being of constant width but with different type elements having different middle-line lengths whereby the type elements differ from each other in their areas, the element 8 having the longest and the element 1 having the shortest middle-line with the remaining elements being provided with middle-line lengths between those of the 1 and 8 in substantially equally graduated steps independently of the numerical value of the elements.

2. Type elements adapted for use with type carriers of a printing device comprising a set of type adapted upon operation of the device to print characters of the numeral series 0 through 9, the portion of the type forming the character lines being of constant width but with different type elements having different middle-line lengths whereby the type elements differ from each other in their areas, said type elements having middle-line lengths increasing in the sequence 1—7—2—3—4—0—5—6—9—8.

MICHAEL MAUL.